Feb. 2, 1965 E. E. NEELY 3,168,376
PROCESS FOR THE PURIFICATION OF LIQUID CHLORINE
Filed Oct. 22, 1963
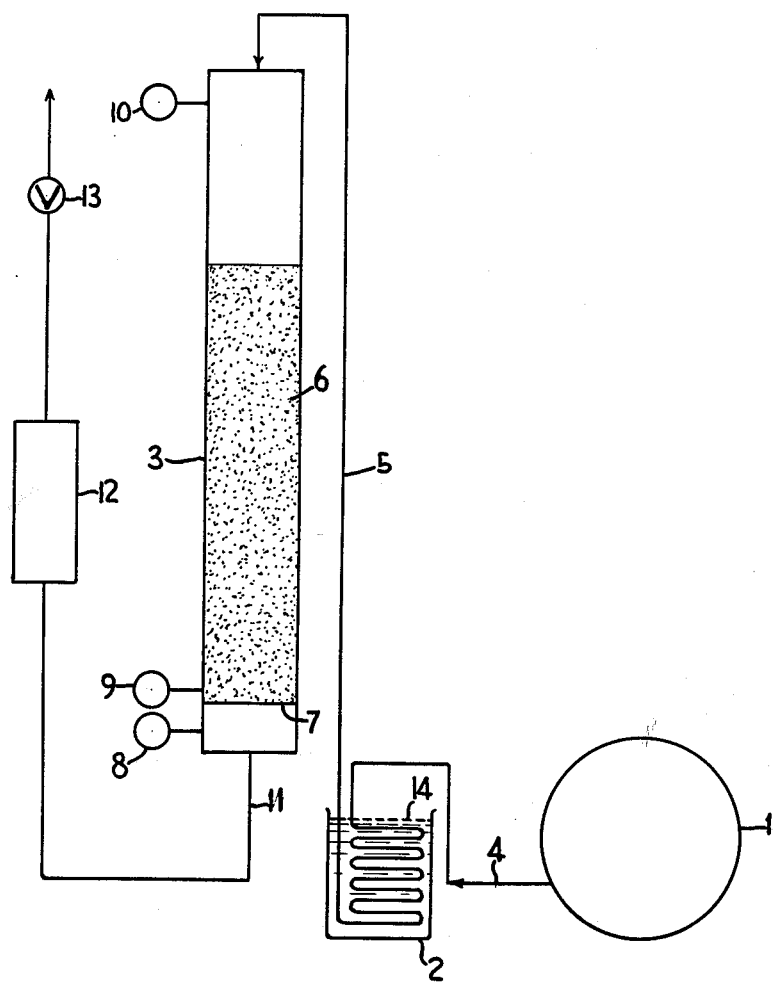
INVENTOR.
ELBERT E. NEELY
BY
Oscar L. Spencer
ATTORNEY United States Patent Office 3,168,376
Patented Feb. 2, 1965

3,168,376
PROCESS FOR THE PURIFICATION OF LIQUID CHLORINE
Elbert E. Neely, Corpus Christi, Tex., assignor to Pittsburgh Plate Glass Company, Pittsburgh, Pa., a corporation of Pennsylvania
Filed Oct. 22, 1963, Ser. No. 318,484
11 Claims. (Cl. 23—219)

The present invention relates to the purification of liquid chlorine. More particularly, the present invention relates to the removal of non-volatile impurities from liquid chlorine.

Chlorine users are constantly requiring more rigid specifications for liquid chlorine supplied to them by chemical manufacturers. As a result of these more rigid specifications, liquid chlorine producers are constantly working to improve product purity. Liquid chlorine as currently produced contains small quantities of non-volatile impurities, typically 0.003 percent by weight. Occasionally these impurities reach a higher level during storage but usually they are present in quantities in thousandths of a percent. While this quantity of an impurity is extremely small and not deleterious for most uses, it is desirable to reduce it even further.

In accordance with this invention a novel method is provided which essentially eliminates the non-volatile impurities contained in liquid chlorine. The method employed is inexpensive and permits rapid, efficient removal of the non-volatile content of liquid chlorine without any difficulty. The method is readily adaptable to large scale purification by the manufacturer or can easily be installed at the users site so that purification can be accomplished by the customer.

In accordance with this invention liquid chlorine is contacted with a finely divided hydrated silica, preferably maintained in a column, and after contact removed and placed in storage and/or use. The column is operated under pressure sufficient to maintain the chlorine in the liquid state. The non-volatile content of the liquid chlorine contacting the hydrated silica is removed by the silica and the liquid chlorine emerging from the column is found to contain little or no non-volatile impurities.

Non-volatile impurities as referred to herein in the specification and claims refers to those impurities which are contained in liquid chlorine that are left behind when the liquid chlorine containing them is permitted to flash evaporate. In testing for these impurities, a given weight of liquid chlorine is placed in a dry tared flask and weighed. The contents are then permitted to flash evaporate. After evaporation the flask is swept dry with an air stream at a flow rate of 500 cc. per minute for 10 minutes. The flask is then reweighed to determine the weight percent of non-volatile impurities present. The nature of these impurities will vary considerably and such materials as iron and copper, organic complexes and some hexachloroethane are typical of the type of materials which form these non-volatile residues.

The material used to contact liquid chlorine and successfully remove the non-volatile residue may be a finely-divided hydrated silica such as Hi-Sil (a very fine particle size hydrated silica manufactured by the Pittsburgh Plate Glass Company). This material is the preferred contact material in accordance with this invention. Other materials have also been employed successfully. Thus, Silene EF (a precipitated, hydrated calcium silicate manufactured by the Pittsburgh Plate Glass Company) has also been found effective in removing non-volatile impurities from liquid chlorine. Finely-divided hydrated silicas having surface areas between 75 to 400 square meters per gram are typical of the hydrated silicas which are employed in accordance with the teachings of this invention. These materials typically have an oil absorption value (Rub-in-Method) of over 100 grams of oil per 100 grams of material, generally the oil absorption value is between 100 to 350 grams of oil per 100 grams of material. These materials are very finely divided with their ultimate particle size being typically 0.03 micron or smaller. In general as used during the purification procedure, the material is in aggregated form preferably ranging in size from —10 to +50 mesh (U.S. Sieve Series). Some variations in the mesh size of the aggregate is permissive and generally —10 to +150 mesh material may be employed.

For a more complete understanding of the present invention reference is made to the accompanying drawing which diagrammatically illustrates a purification train suitable for use in the practice of the instant invention.

In the drawing there is shown a liquid chlorine storage tank 1, a heat exchanger 2 and a chlorine purification tower 3.

In the operation of the train depicted, liquid chlorine is removed from the storage tank 1 and passed through a line 4 to the heat exchange tank 2, containing a cooling solution indicated by the numeral 14. The liquid chlorine after circulating through the heat exchange tank is transported through line 5 to the top of the purification column 3. The column 3 is packed with a finely-divided hydrated silica 6 and the silica is held in place in the column by a steel mesh support 7 over which is placed a fiberglass mat (not shown). A pressure gauge 8 is located below the steel mesh support and another gauge 9 is located immediately above the support. A third pressure gauge 10 is located at the upper portion of the column adjacent the top.

The liquid chlorine leaves the purification column 3 through line 11 where it is passed through a rotameter 12. A throttling valve 13 is located above the rotameter to regulate flow of the liquid chlorine in line 11.

The flow rate of liquid chlorine through the column may be varied considerably and will be determined in part at least by the presence or absence of impurities in the exit stream from the purification column. Flow rates of up to 9000 pounds of liquid chlorine per hour per square foot of silica have been employed successfully. In determining the optimum flow rate, liquid chlorine can be fed at rates of 300 pounds per hour per square foot of silica and increased until the flow rate becomes too high for the silica to remove the non-volatiles present. What flow rates are precisely selected will therefore depend on the quantities of impurities present in the feed chlorine and the age of the silica bed. With quantities of non-volatile impurities in the range of 0.002 to 0.006 percent by weight and a fresh bed of hydrated silica high flow rates on the order of 7,000 to 10,000 pounds per hour per square foot of bed may be readily utilized to remove these impurities and reduce their level in the purified streams emerging from the column to 0.001 percent by weight or less. With larger quantities of impurities for example 0.008 to 0.01 percent and a fresh bed of hydrated silica, the flow rate may be reduced to 3,000 to 6,000 pounds per hour per square foot of bed to insure adequate contact time of the impurities with the silica. Since the exit streams from these columns will be checked periodically for exhaustion of the silica evidenced by increased non-volatile content in the purified chlorine, this serves as a convenient control for determining the flow rate of chlorine through the column. Thus, generally the flow rate of liquid chlorine may be increased to any rate desired until the non-volatile content of the exit liquid chlorine reaches a value of 0.001 percent or more.

Pressure drop across the bed varies with the flow rate of chlorine and typically ranges between 1 to 35 pounds p.s.i.g. Normally the column will operate with a pressure drop across it of 10 to 15 p.s.i.g. In the operation of the column a heavily discolored area of the packing has been found to appear at the top of the column as liquid chlorine is fed to the top which discoloration works its way to the bottom and eventually causes a sharp increase in the pressure drop across the column. When a sharp increase in pressure drop occurs, that is, 15 to 25 p.s.i.g., with a constant flow rate being maintained, the column should be shut down and recharged with fresh material. Because of the eventual spread of this discolored layer of material down the column, it is preferable that relatively long columns be employed. In this manner, the discolored area will increase in area slowly down through the column and cause a sharp increase in pressure drop before it reaches the bottom. Operating in this preferred manner, there will always be present in the lower portion of the column sufficient hydrated silica to adequately purify the liquid chlorine even when the pressure drop increases sharply. In this way, the liquid chlorine is always adequately purified while a convenient measure of the approaching exhaustion of the column is provided.

The particular size column that is employed will vary considerably depending on the quantity of impurities and pounds of chlorine to be purified. Thus, columns may range in height from two feet to twelve feet or more. The beds of hydrated silica used in these columns will vary with the impurity level of the chlorine and the quantity of chlorine to be measured. As a convenient measure of this bed height, it has been found that these beds are capable of removing 80 percent of their own weight in non-volatile impurities. Thus, 100 grams of a hydrated silica of the type aforementioned can remove 80 grams of non-volatile impurity before it reaches the point of exhaustion. With this as a measure of effective impurity removed, it is a simple matter to calculate the necessary bed depth to accomplish effective removal of a given quantity of impurity in a given volume of liquid chlorine. The bed diameters like the heights are therefore variable and beds ranging in diameter from 1 inch to 12 inches or more can be used.

For a more complete understanding of the present invention reference is made to the following examples which are illustrative of certain modes of operation which may be employed in practicing the instant invention.

*Example I*

A system was employed such as shown in the drawing. The column was a steel column six feet in height and with an internal diameter of two inches. A stainless steel mesh support was positioned in the column above the bottom of the column to provide a free space below the support. The liquid chlorine was fed from a 1 ton tank and forced through the column by the gas pressure in the tank. The liquid chlorine prior to entering the column was passed through a cooling chamber or heat exchanger to prevent any flashing when it entered the column. The liquid chlorine used was contaminated with residues from a conventional chlorine purification still to provide liquid chlorine feed containing 0.01 percent by weight non-volatile impurities. The flow rate of the liquid chlorine was varied during the run between 315 to 5360 pounds per hour per square foot. The column was charged during this series of runs with a hydrated silica Hi-Sil 233 (a hydrated silica manufactured by the Pittsburgh Plate Glass Company) to depths of 18 to 48 inches. The liquid chlorine removed during the run contained 0.006 percent by weight non-volatile after completion of the run. The liquid chlorine fed during the run was cloudy and upon completion was found to be clear.

*Example II*

Utilizing the column and other equipment of Example II and operating with a bed of Hi-Sil 18 inches in depth, one ton of liquid chlorine is fed to the column. The non-volatile content of the liquid chlorine is 0.003 percent by weight and the flow rate of liquid chlorine is maintained at 5,000 pounds per hour per square foot during the run. At the end of the run the non-volatile content of the liquid chlorine is found to be 0.002 percent by weight.

*Example III*

A one ton tank of liquid chlorine containing 0.004 percent by weight non-volatile impurities is fed to the column of Example I containing 48 inches of Hi-Sil 233. The liquid chlorine is fed to the column at a rate of 8500 pounds per hour per square foot of silica. The purified chlorine is found to contain less than 0.001 percent by weight non-volatile impurities.

*Example IV*

Using the equipment of Example I, a bed of Silene EF (a hydrated calcium silicate made by the Pittsburgh Plate Glass Company) 18 inches high is placed in the column. Liquid chlorine containing 0.005 percent by weight non-volatile impurities is passed through the bed at a flow rate of 4,000 pounds per hour per square foot of bed. After one ton of chlorine was passed through the column, it is measured for its non-volatile control and found to contain 0.002 precent by weight non-volatiles.

*Example V*

Using the equipment of Example I, one ton of liquid chlorine containing 0.008 percent by weight non-volatile impurities is passed through a 48 inch bed of Hi-Sil 101. The flow rate is maintained at 8500 pounds per hour per square foot. At the completion of the run, the chlorine is found to contain less than 0.001 percent by weight non-volatile impurities.

*Example VI*

Using the equipment of Example I, liquid chlorine containing 0.006 percent non-volatile impurities by weight was passed through an 18 inch bed of Hi-Sil 233. The liquid chlorine removed from the column was periodically tested for non-volatile content and measured less than 0.001 percent non-volatile until the quantities of chlorine passed through the column reached 9,000 pounds. At this point the non-volatile impurity level in the exit chlorine reached 0.001 percent by weight and the run was stopped.

In all cases where cloudy liquid chlorine was fed to the purification columns, it was found that the cloudiness was not present after the purification.

While the present invention has been described with reference to certain specific embodiments, it is of course to be understood that the invention is not to be so limited except insofar as appears in the accompanying claims.

This application is a continuation-in-part of my co-pending application U.S. Serial No. 223,634, filed September 14, 1962, now abandoned.

I claim:

1. A method of purifying liquid chlorine containing contaminating quantities of non-volatile impurities comprising contacting said liquid chlorine with a bed of hydrated siliceous material of a member of the group consisting of hydrated silica and hydrated calcium silicate, said member having a surface area of 75 to 350 square meters per gram and an oil absorption of 100 to 350 grams per 100 grams of said member to thereby provide a substantial reduction in the non-volatile impurities contained in said liquid chlorine.

2. A method of purifying liquid chlorine comprising contacting liquid chlorine containing more than 0.001 percent by weight non-volatile impurities with a bed of finely-divided hydrated silica having an oil absorption value of 100 to 350 grams per 100 grams of silica and removing liquid chlorine from said bed substantially free of said non-volatile impurities.

3. A method of continuously purifying liquid chlorine containing at least 0.001 percent by weight non-volatile impurities comprising introducing liquid chlorine into a bed of hydrated silica having an oil absorpton value of 100 to 350 grams per 100 grams of silica, removing liquid chlorine from said bed, continuing the introduction and removal of liquid chlorine in and from the bed until the non-volatile content of the liquid chlorine removed from the bed begins to increase over the content removed at the beginning of the operation.

4. The method of claim 3 wherein the bed is composed of a hydrated calcium silicate having an oil absorption value of 100 to 350 grams per 100 grams of silicate.

5. A method of purifying liquid chlorine comprising contacting liquid chlorine containing at least 0.001 percent by weight non-volatile impurities with a bed of hydrated silica having an oil absorption of 100 to 350 grams per 100 grams of silica, removing liquid chlorine from said bed containing less than 0.001 percent by weight non-volatile impurities while controlling the feed rate of liquid chlorine to provide between 500 to 9,000 pounds per hour per square foot of bed liquid chlorine during said contact.

6. The method of claim 1 wherein the liquid chlorine is cooled prior to contact with said bed.

7. The method of claim 1 wherein said bed is maintained under a pressure sufficient to maintain liquid chlorine in the liquid state.

8. A method of purifying liquid chlorine containing contaminating quantities of non-volatile impurities, said impurities containing at least one member of the group consisting of iron, copper and hexachloroethane comprising, contacting said liquid chlorine with a bed of hydrated siliceous material of a member of the group consisting of hydrated silica and hydrated calcium silicate, said member having a surface area of 75 to 350 square meters per gram and an oil absorption of 100 to 350 grams per 100 grams of said member to thereby provide a substantial reduction in the non-volatile impurities contained in said liquid chlorine.

9. A method of purifying liquid chlorine containing contaminated quantities of non-volatile impurities, comprising contacting said liquid chlorine of siliceous material of the member of the group consisting of hydrated silica and hydrated calcium silicate, said member having an oil absorption value above 100 grams per 100 grams of said member and removing liquid chlorine from said bed substantially free of said non-volatile impurities.

10. A method of purifying liquid chlorine containing contaminating quantities of non-volatile impurities comprising contacting said liquid chlorine with a bed of hydrated siliceous material of a member of the group consisting of hydrated silica and hydrated calcium silicate, said member having a surface area of 75 to 350 square meters per gram and an oil absorption value of over 100 grams per 100 grams of said member to thereby provide a substantial reduction in the non-volatile impurities contained in said liquid chlorine.

11. The method of claim 10 wherein said member is a finely-divided hydrated silica.

References Cited in the file of this patent

UNITED STATES PATENTS 2,312,952    Balcar _____ Mar. 2, 1943

OTHER REFERENCES

J. W. Mellor's book "A Comprehensive Treatise on Inorganic and Theoretical Chem.," vol. 2, 1922 Ed.; p. 90. Longmans, Green and Co., N.Y.

E. Heftmann book, "Chromatography," pp. 56, 57, 58. Reinhold Pub. Corp., New York, 1961 Ed.